US012430858B2

(12) United States Patent
Chang et al.

(10) Patent No.: US 12,430,858 B2
(45) Date of Patent: Sep. 30, 2025

(54) AUGMENTED REALITY DISPLAY SYSTEM AND AUGMENTED REALITY DISPLAY DEVICE WITH IMPROVED LIGHT UTILIZATION EFFICIENCY

(71) Applicant: Luxshare Precision Technology (Nanjing) Co., LTD, Nanjing (CN)

(72) Inventors: Liyuan Chang, Nanjing (CN); Cheng Wang, Nanjing (CN); Guojun Xu, Nanjing (CN)

(73) Assignee: LUXSHARE PRECISION TECHNOLOGY (NANJING) CO., LTD, Nanjing (CN)

( * ) Notice: Subject to any disclaimer, the term of this patent is extended or adjusted under 35 U.S.C. 154(b) by 253 days.

(21) Appl. No.: 18/197,844

(22) Filed: May 16, 2023

(65) Prior Publication Data
US 2024/0233282 A1   Jul. 11, 2024

(30) Foreign Application Priority Data
Jan. 6, 2023   (CN) .......................... 202310016317.3

(51) Int. Cl.
*G06T 19/00*   (2011.01)
*G02B 6/10*   (2006.01)
*G02B 6/30*   (2006.01)

(52) U.S. Cl.
CPC .............. *G06T 19/006* (2013.01); *G02B 6/10* (2013.01); *G02B 6/30* (2013.01)

(58) Field of Classification Search
CPC ............ G02B 27/0093; G02B 27/0172; G02B 27/0176; G02B 2027/0125;
(Continued)

(56) References Cited

U.S. PATENT DOCUMENTS

| 11,480,788 B2 | 10/2022 | Popovich et al. |
| 12,055,721 B2 * | 8/2024 | Oh .......................... G06F 3/013 |

(Continued)

FOREIGN PATENT DOCUMENTS

| CN | 107831568 A | 3/2018 |
| CN | 108139587 A | 6/2018 |

(Continued)

*Primary Examiner* — Nelson M Rosario
(74) *Attorney, Agent, or Firm* — Birch, Stewart, Kolasch & Birch, LLP

(57) ABSTRACT

An augmented reality display system includes a body, an image source device configured to output image information, an optical waveguide device configured to receive the image information, and an optical fiber array image transmission bundle. The optical fiber array image transmission bundle includes a number of optical fibers. Each optical fiber includes an input end and an output end. Each input end is coupled with a first microlens protruding outward, and each output end is coupled with a second microlens protruding outward. The image information output by the image source device is coupled into the optical fiber array image transmission bundle through the first microlenses for total reflection, and then collimated by the second microlenses and emitted directly to the optical waveguide device. An augmented reality display device having the augmented reality display system is also disclosed.

20 Claims, 6 Drawing Sheets

(58) Field of Classification Search
CPC .... G02B 2027/0169; G02B 2027/0174; G02B 2027/0187; G02B 27/00; G02B 27/01; G02B 6/10; G02B 6/30; G02B 2027/0178; G06F 3/0421; G06F 3/0433; G06F 3/0436; G06T 19/006; Y02D 10/00
See application file for complete search history.

(56) References Cited

U.S. PATENT DOCUMENTS

| | | | |
|---|---|---|---|
| 2018/0188542 A1* | 7/2018 | Waldern | G06F 3/0433 |
| 2019/0178638 A1 | 6/2019 | Abovitz et al. | |
| 2021/0373344 A1 | 12/2021 | Loyola et al. | |
| 2022/0171190 A1* | 6/2022 | Trisnadi | H04N 13/398 |

FOREIGN PATENT DOCUMENTS

| | | |
|---|---|---|
| CN | 111025661 A | 4/2020 |
| CN | 111474724 A | 7/2020 |
| CN | 111983806 A | 11/2020 |
| CN | 108463767 B | 10/2021 |
| CN | 114080294 A | 2/2022 |
| CN | 111751981 B | 11/2022 |

* cited by examiner

AUGMENTED REALITY DISPLAY SYSTEM AND AUGMENTED REALITY DISPLAY DEVICE WITH IMPROVED LIGHT UTILIZATION EFFICIENCY

CROSS-REFERENCE TO RELATED APPLICATION

This patent application claims priority of a Chinese Patent Application No. 202310016317.3, filed on Jan. 6, 2023 and titled "AUGMENTED REALITY DISPLAY SYSTEM AND AUGMENTED REALITY DISPLAY DEVICE", the entire content of which is incorporated herein by reference.

TECHNICAL FIELD

The present disclosure relates to a field of augmented reality display, and in particular to an augmented reality display system and an augmented reality display device.

BACKGROUND

With the rapid development of the information age, augmented reality technology (Augmented Reality, AR) has been widely studied. AR is a technology that combines the real world with virtual information based on real-time computing and multi-sensor fusion. Most of the existing consumer-grade ARs cannot reach the lightweight level. The optical machine part of the existing AR glasses adopts a traditional optical system, which is not easy to reduce in weight and volume, requires a large number of components, and the system structure is complex, and rigidity does not provide flexibility. The next generation of smart AR glasses pursues an integrated design, and is more portable and fashionable in appearance. In terms of optical display, the pursuit of micro-displays with small size, high brightness, and high resolution is more stringent for the miniaturization of the optical and mechanical parts of AR glasses. Furthermore, optical machine display technology with high resolution, high light efficiency and high flexibility has gradually become a trend of AR.

Therefore, it is necessary to provide a new augmented reality display system and augmented reality display device to solve the above problems.

SUMMARY

An object of the present disclosure is to provide an augmented reality display system and an augmented reality display device, so as to improve the light utilization efficiency of the augmented reality display system and the augmented reality display device.

In order to achieve the above object, the present disclosure adopts the following technical solution: an augmented reality display system, including: a body; an image source device arranged in the body, the image source device being configured to output image information; an optical waveguide device arranged in the body, the optical waveguide device being configured to receive the image information; and an optical fiber array image transmission bundle arranged in the body, the optical fiber array image transmission bundle being arranged between the image source device and the optical waveguide device, the optical fiber array image transmission bundle including a plurality of optical fibers, each of the plurality of optical fibers including an input end and an output end opposite to the input end, arrangement positions of end faces of the plurality of optical fibers at the input ends and at the output ends being the same, each input end being coupled with a first microlens protruding outward, each output end being coupled with a second microlens protruding outward, the image information output by the image source device being coupled into the optical fiber array image transmission bundle through the first microlenses for total reflection, and then collimated by the second microlenses and emitted directly to the optical waveguide device.

In order to achieve the above object, the present disclosure adopts the following technical solution: an augmented reality display device, including an augmented reality display system, the augmented reality display system including: a body; an image source device arranged in the body, the image source device being configured to output image information; an optical waveguide device arranged in the body, the optical waveguide device being configured to receive the image information; and an optical fiber array image transmission bundle arranged in the body, the optical fiber array image transmission bundle being arranged between the image source device and the optical waveguide device, the optical fiber array image transmission bundle including a plurality of optical fibers, each of the plurality of optical fibers including an input end and an output end opposite to the input end, arrangement positions of end faces of the plurality of optical fibers at the input ends and at the output ends being the same, each input end being coupled with a first microlens protruding outward, each output end being coupled with a second microlens protruding outward, the image information output by the image source device being coupled into the optical fiber array image transmission bundle through the first microlenses for total reflection, and then collimated by the second microlenses and emitted directly to the optical waveguide device.

Compared with the prior art, the beneficial effect of the present disclosure is as follows: the present disclosure couples microlenses to the input ends and the output ends of the optical fibers, respectively. The parameters of the microlenses are designed according to the requirements of the matching image source device, the optical fiber array image transmission bundle and the optical waveguide device. The image information output by the image source device is coupled into the optical fiber array image transmission bundle through the first microlenses for total reflection, and then collimated by the second microlenses and emitted directly to the optical waveguide device. The augmented reality display device of the present disclosure is light in weight, high in freedom, easy to realize image transmission of complex structures, and can increase the utilization rate of light energy to 90%. Moreover, with this solution, the design of the optical machine can be arranged according to ergonomics, and will no longer be limited by the optical structure. In addition, a large number of single optical fibers are arranged according to certain rules through micro-nano processing methods to form the optical fiber array image transmission bundle for transmitting wide-spectrum optical images. Introducing the optical fiber array image bundle into an imaging system can significantly improve the overall performance of the system.

DETAILED DESCRIPTION

Figure 1:
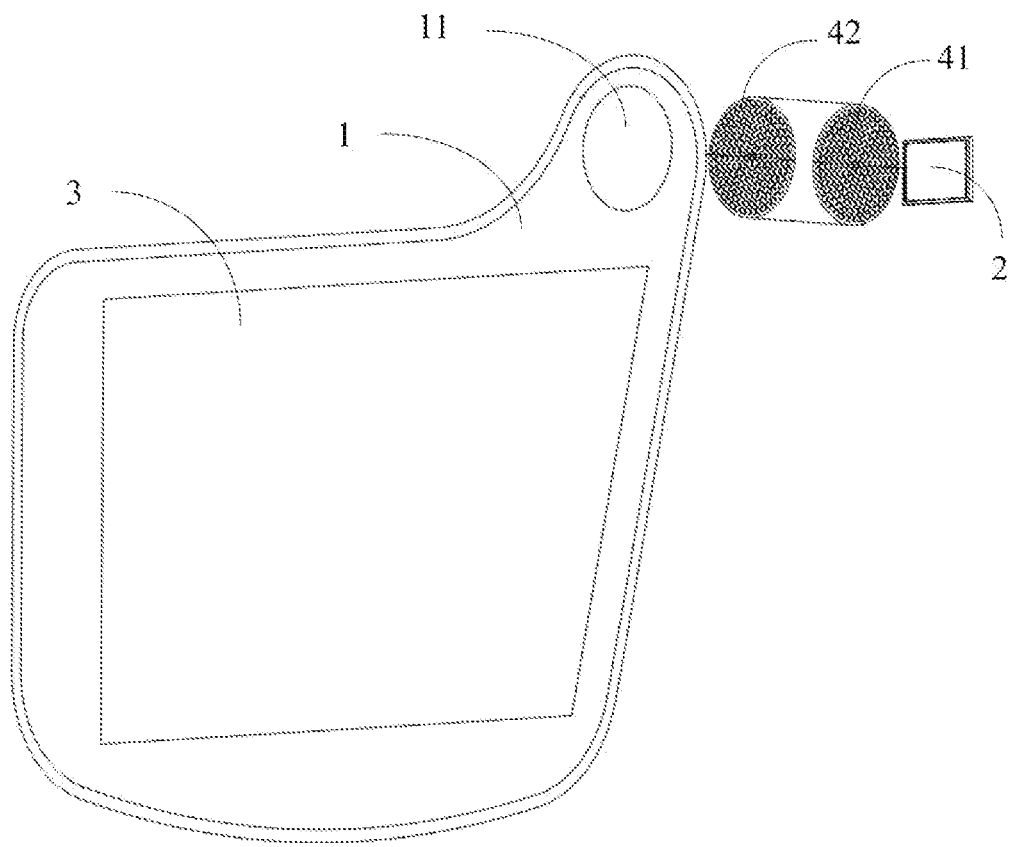
FIG. 1 is a schematic view of an augmented reality display system in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 9, the present disclosure discloses an augmented reality display system. The augmented reality display system includes a body, an image source device 2, an optical waveguide device 3 and an optical fiber array image transmission bundle 4. In this embodiment, the body is glasses. The body includes a frame 1, a substrate and at least one leg. The substrate is disposed in the frame 1. Two legs are provided and pivotally arranged on left and right sides of the frame 1, respectively. Preferably, the image source device 2 is arranged in the leg. The image source device 2 is used to output image light information. The image source device 2 is a Micro LED, or a Micro OLED, or an LCOS. The frame 1 has a coupling end 11 communicating with the optical waveguide device 3.

According to the analysis of the composition and optical principles of AR glasses, the optical mechanism of conventional AR glasses is usually arranged on the leg of the glasses, and is close to a side of the frame 1. From the perspective of wearing comfort, binocular optical machines are arranged on the side close to the frame 1. If the wearer wears it for a long time, due to the uneven distribution of the overall gravity of the glasses, the glasses will have a greater sense of pressure on the bridge of the wearer's nose. Moreover, during the wearing process, movements such as bowing the head may be greatly restricted by gravity on one side. Generally speaking, from the perspective of ergonomics, conventional optical machine design schemes have certain restrictions on the structural stacking and wearing comfort of the whole machine.

Figure 2:
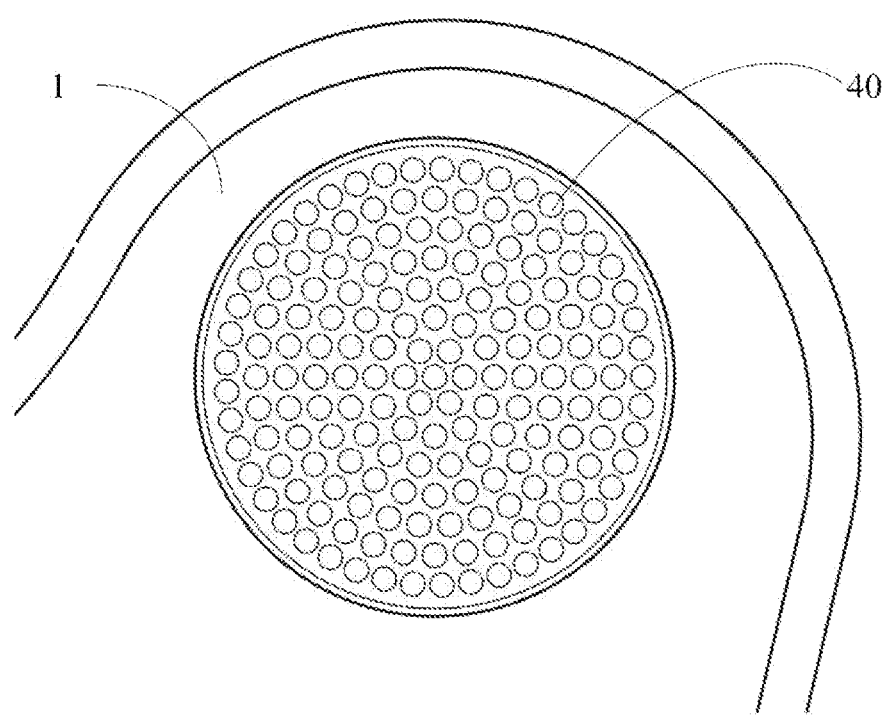
FIG. 2 is a schematic view of a coupling state between an output end and a body of the optical fiber array image transmission bundle in FIG. 1.
Figure 3:
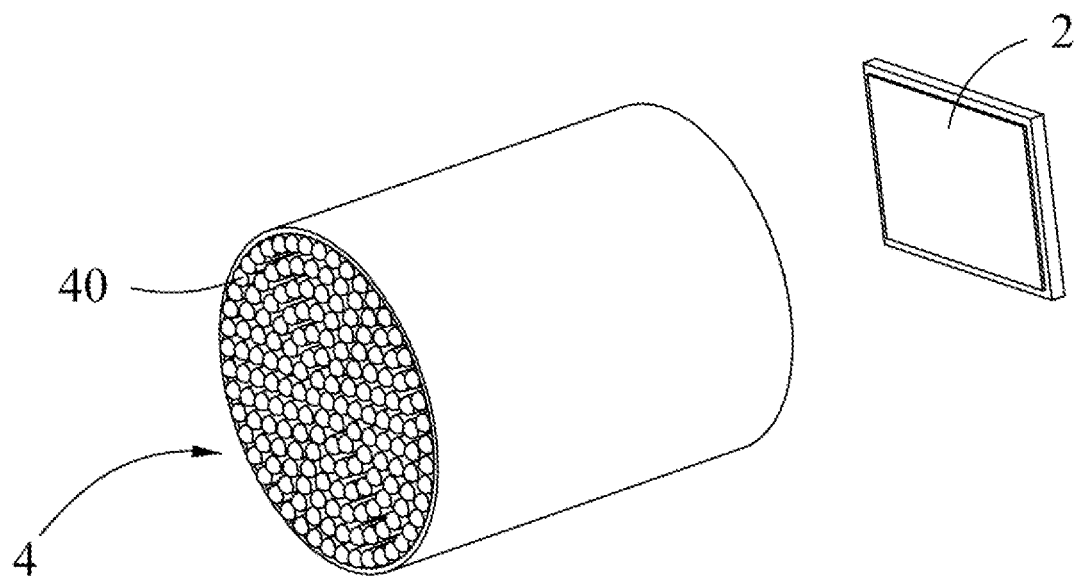
FIG. 3 is an exploded perspective schematic view of input ends of the optical fiber array image transmission bundle and an image source device in FIG. 1.
Figure 4:
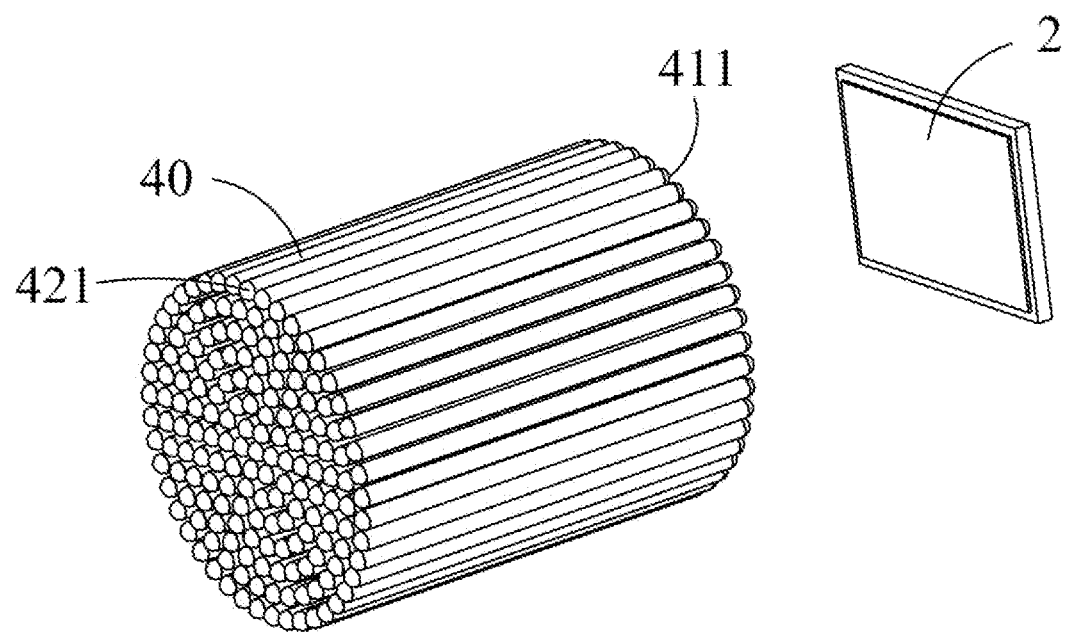
FIG. 4 is a schematic exploded perspective view of a middle section of the optical fiber array image transmission bundle and the image source device in FIG. 1.
Figure 5:
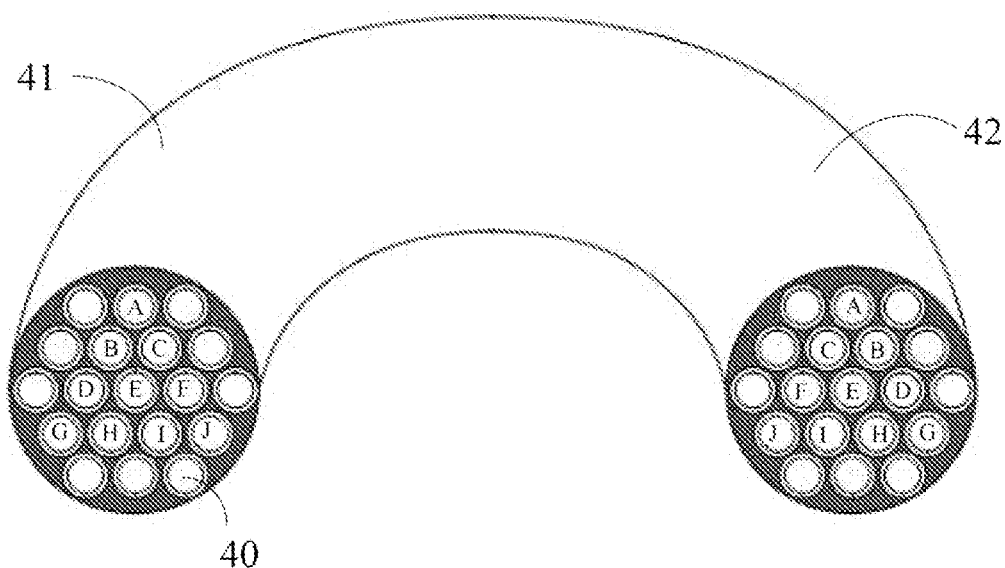
FIG. 5 is a perspective schematic view of the optical fiber array image transmission bundle in FIG. 1.
Figure 6:
FIG. 6 is a schematic front view of a single optical fiber disclosed in an embodiment of the present disclosure.

Referring to FIG. 1 and FIG. 2, the optical waveguide device 3 is disposed on the substrate for receiving image light information output by the image source device 2. The optical waveguide device 3 is pasted on the substrate. The optical waveguide device 3 is an array optical waveguide, or a diffractive optical waveguide, or a holographic optical waveguide.

The optical fiber array image transmission bundle 4 is arranged on the leg, and connects the image source device 2 and the optical waveguide device 3. The fiber array imaging bundle 4 includes a plurality of optical fibers 40. Each optical fiber 40 includes an input end 41 and an output end 42 opposite to the input end 41. The output ends 42 are plugged into the coupling end 11 and coupled to the optical waveguide device 3. Each input end 41 has a first microlens 411 protruding outward. Each output end 42 has a second microlens 421 protruding outward.

Referring to FIG. 1 to FIG. 5, the image information output by the image source device 2 is coupled into the optical fiber array image transmission bundle 4 through the first microlenses 411 for total reflection, and then collimated by the second microlenses 421 and emitted directly to the optical waveguide device 3. By providing the microlenses coupled to the input ends 41 and output ends 42 of the optical fibers 40, respectively; and the parameters of the microlenses being designed according to the requirements of the matching image source device 2, the optical fiber array image transmission bundle 4 and the optical waveguide device 3, the augmented reality display device of the present disclosure is light in weight, high in freedom, easy to realize image transmission of complex structures, and can increase the utilization rate of light energy to 90%. Moreover, with this solution, the design of the optical machine can be arranged according to ergonomics, and will no longer be limited by the optical structure. In addition, a large number of single optical fibers 40 are arranged according to certain rules through micro-nano processing methods to form the optical fiber array image transmission bundle 4 for transmitting wide-spectrum optical images. Introducing the optical fiber array image bundle 4 into an imaging system can significantly improve the overall performance of the system.

Referring to FIG. 3 to FIG. 7, the optical fiber 40 includes a fiber core 401 and a cladding layer 402 surrounding the fiber core 401. The first microlens 411 and the second microlens 421 are disposed at two ends of the fiber core 401, respectively, along an axial direction of the fiber core 401. The first microlens 411 and the second microlens 421 are respectively convex lenses, and are glued and arranged at two ends of the fiber core 401 in the axial direction. The plurality of optical fibers 40 are arranged side by side to form the optical fiber array image transmission bundle 4. The plurality of optical fibers 40 at the input ends 41 and the plurality of optical fibers 40 at the output ends 42 are glued and fixed. The fiber array image transmission bundle 4 further includes a middle section which is located between the input ends 41 and the output ends 42. The middle section is in a loose shape, so that the optical fiber array image transmission bundle 4 is flexible, which is convenient for the stacking design of the whole machine structure.

Figure 8:
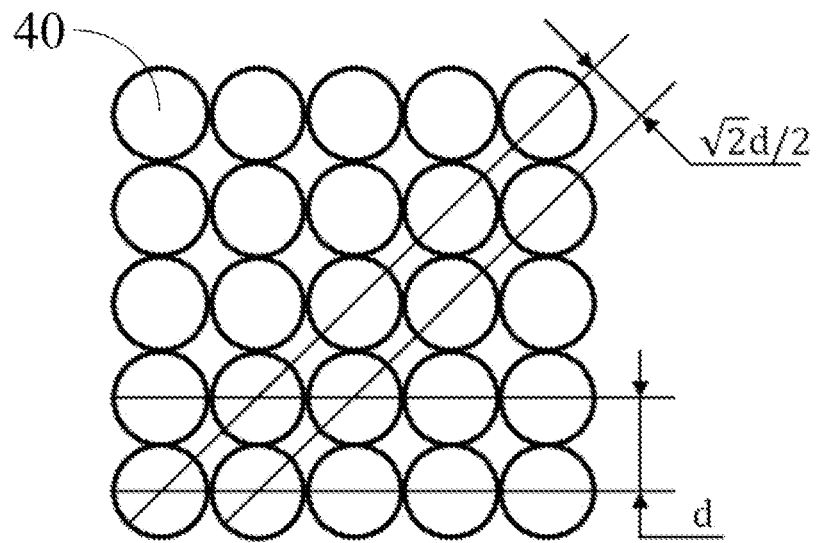
FIG. 8 is a schematic view of a square arrangement of a plurality of optical fibers of the optical fiber array image transmission bundle.
Figure 9:
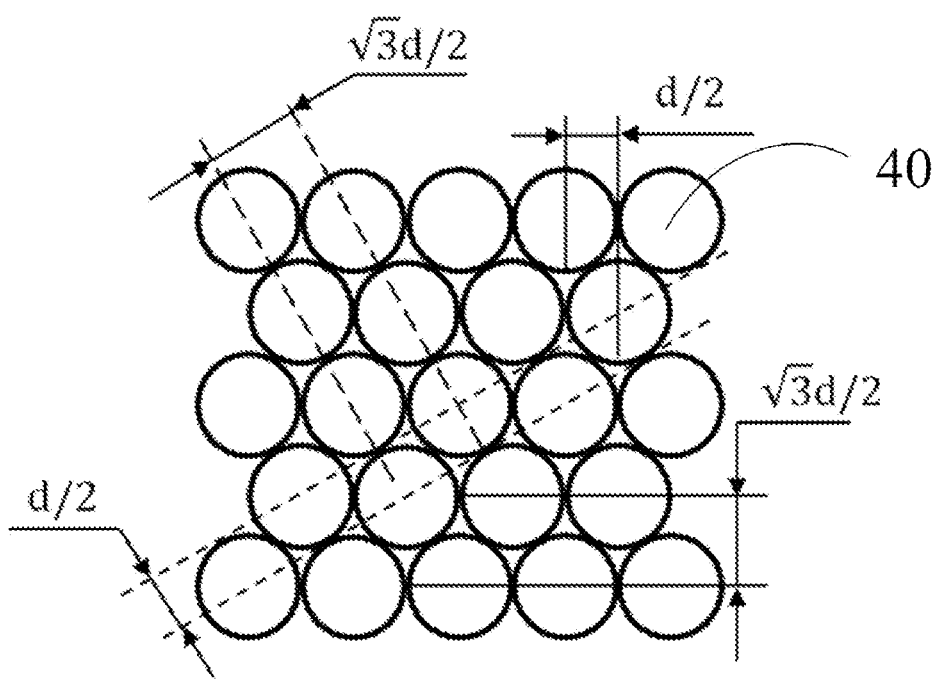
FIG. 9 is a schematic view of a hexagonal arrangement of the plurality of optical fibers of the optical fiber array image transmission bundle.

Referring to FIG. 8 to FIG. 9, end faces of the input ends 41 and end faces of the output ends 42 of the plurality of optical fibers 40 are geometrically arranged in a same position. For example, the end faces of the plurality of optical fibers 40 are hexagonal. Each optical fiber 40 has good optical insulation. That is, each optical fiber 40 in the optical fiber array image transmission bundle 4 can transmit light independently without being affected by surrounding optical fibers 40.

Figure 7:
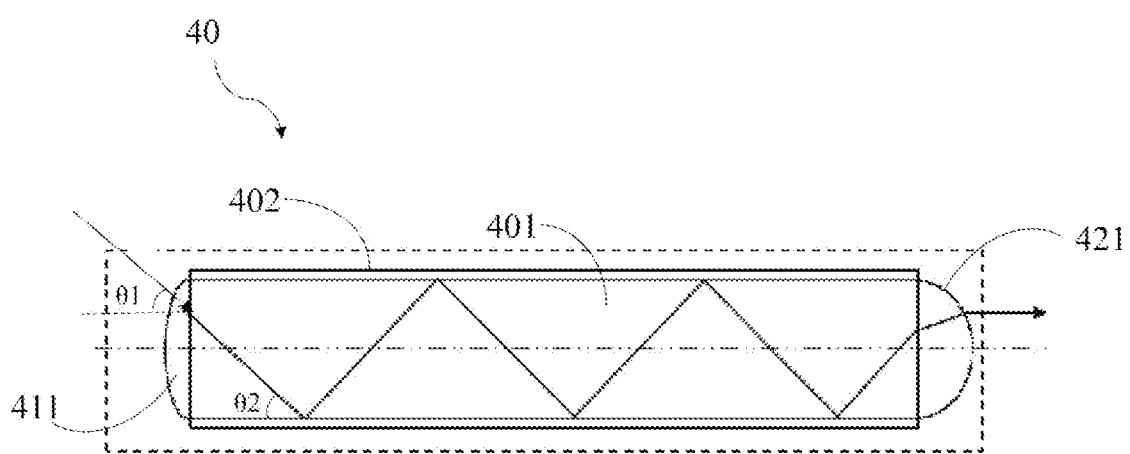
FIG. 7 is a schematic view of a light transmission path in the single optical fiber of the present disclosure.

Referring to FIG. 7, the image source device 2 is coupled to the first microlenses 411, and image light information is coupled into the fiber core 401 through the first microlenses 411 at a first angle θ1. The image light information is totally reflected and transmitted between a junction of the fiber core 401 and the cladding layer 402 at a second angle θ2, and is collimated and emitted directly to the optical waveguide device 3 through the second microlenses 421. At this time, it is required that the second angle θ2 is greater than or equal to a critical angle C. The critical angle C is calculated as follows:

$$C = \arcsin(m/n)$$

wherein m is a refractive index of the cladding layer 402, and n is a refractive index of the fiber core 401.

Referring to FIG. 8 and FIG. 9, according to the theory of information optics, a discrete structure image transmission element composed of optical fibers, the pixel carried by a single optical fiber can be regarded as the smallest single information point, because the single optical fiber cannot be expected to convey details of spatial information smaller than the core diameter. Under the premise that the optical fibers are arranged regularly and the insulation of each optical fiber is good, the resolution of the image transmission bundle mainly depends on the spacing and arrangement of the centers of adjacent optical fibers. If a sampling distance between adjacent optical fibers is do which is equal to the fiber diameter d, the theory of information optics points out that the maximum spatial frequency that can be transmitted in the situation shown in the drawings should be determined by the reciprocal $\frac{1}{2}d_0$ ($=\frac{1}{2}d$) of twice the sampling distance on an image plane.

(1) If the optical fibers 40 in the optical fiber array image transmission bundle 4 are arranged in a square:

when the orientation is 0, π/2, the centers of adjacent optical fibers 40 are located on a same straight line, the distance (the sampling distance) between two adjacent rows of optical fibers 40 is $d_0=d$, then the resolution is ½d;

when the orientation is π/4, π¼, the centers of the interlaced optical fibers 40 are located on a same straight line, the distance (the sampling distance) between two adjacent rows of optical fibers 40 is $d_0=\sqrt{2d}$, then the resolution is $\sqrt{2d}/2$.

(2) If the optical fibers 40 in the optical fiber array image transmission bundle 4 are arranged in a hexagonal shape:

when the orientation is 0, π/3, 2π/3, the centers of adjacent optical fibers 40 are located on a same straight line, the distance (the sampling distance) between two adjacent rows of optical fibers 40 is $d_0=1/\sqrt{3d}$, then the resolution is $\sqrt{3d}/2$;

when the orientation is π/6, π/2, 5π/6, the centers of the interlaced optical fibers 40 are located on a same straight line, the distance (the sampling distance) between two adjacent rows of optical fibers 40 is $d_0=d/2$, then the resolution is 1/d.

The square arrangement has a limit resolution $R1=\frac{1}{2}d(lp/mm)$ along the directions of 0, π/2. The hexagonal arrangement has a limit resolution $R2=1/\sqrt{3d}(lp/mm)$ along the directions of 0, π/3, 2π/3. Therefore, in the case of the same diameter of the optical fiber 40, the resolution of the hexagonal arrangement is better than that of the square arrangement. The resolution of the hexagonal arrangement is 1.15 times that of the square arrangement.

The present disclosure further discloses an augmented reality display device which includes the augmented reality display system. By setting the above-mentioned augmented reality display system, the utilization rate of light and the resolution of display can be improved, so as to further meet the user's requirement for high-definition display images.

In summary, the present disclosure couples the microlenses to the input ends 41 and the output ends 42 of the optical fibers 40, respectively. The parameters of the microlenses are designed according to the requirements of the matching image source device 2, the optical fiber array image transmission bundle 4 and the optical waveguide device 3. The image information output by the image source device 2 is coupled into the optical fiber array image transmission bundle 4 through the first microlenses 411 for total reflection, and then collimated by the second microlenses 421 and emitted directly to the optical waveguide device 3. The augmented reality display device of the present disclosure is light in weight, high in freedom, easy to realize image transmission of complex structures, and can increase the utilization rate of light energy to 90%. Moreover, with this solution, the design of the optical machine can be arranged according to ergonomics, and will no longer be limited by the optical structure. In addition, a large number of single optical fibers 40 are arranged according to certain rules through micro-nano processing methods to form the optical fiber array image transmission bundle 4 for transmitting wide-spectrum optical images. Introducing the optical fiber array image bundle 4 into the imaging system can significantly improve the overall performance of the system.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An augmented reality display system, comprising:
   a body;

an image source device arranged in the body, the image source device being configured to output image information;

an optical waveguide device arranged in the body, the optical waveguide device being configured to receive the image information; and an optical fiber array image transmission bundle arranged in the body, the optical fiber array image transmission bundle being arranged between the image source device and the optical waveguide device, the optical fiber array image transmission bundle comprising a plurality of optical fibers, each of the plurality of optical fibers comprising an input end and an output end opposite to the input end, arrangement positions of end faces of the plurality of optical fibers at the input ends and at the output ends being the same, each input end being coupled with a first microlens which protrudes outward beyond the input end, each output end being coupled with a second microlens which protrudes outward beyond the output end, the image information output by the image source device being coupled into the optical fiber array image transmission bundle through the first microlenses for total reflection, and then collimated by the second microlenses and emitted directly to the optical waveguide device;

wherein the first microlens is physically connected to the input end, and the first microlens is physically connected to the output end.

2. The augmented reality display system according to claim 1, wherein the first microlenses are coupled to the image source device; the image information of the image source device is coupled into the optical fibers along a first angle; the image information is totally reflected along a second angle in the optical fibers through the first microlenses, and then collimated by the second microlenses and emitted directly to the optical waveguide device.

3. The augmented reality display system according to claim 2, wherein the second angle is larger than a critical angle of the optical fiber.

4. The augmented reality display system according to claim 2, wherein each optical fiber comprises a fiber core and a cladding layer surrounding the core; the first microlens and the second microlens are arranged at two ends of the fiber core along an axis direction of the fiber core, respectively; the image source device is coupled into the fiber core at the first angle through the first microlenses, totally reflected between a junction of the fiber core and the cladding layer at the second angle, and then collimated by the second microlenses and emitted directly to the optical waveguide device.

5. The augmented reality display system according to claim 1, wherein the end faces of the plurality of optical fibers are hexagonal.

6. The augmented reality display system according to claim 5, wherein centers of two adjacent optical fibers are located on a same straight line.

7. The augmented reality display system according to claim 1, wherein the optical fibers at the input ends and the optical fibers at the output ends are glued and fixed; the optical fiber array image transmission bundle further comprises a middle section which is located between the input end and the output end.

8. The augmented reality display system according to claim 1, wherein an end face area of the input end is consistent with an area of the image source device.

9. The augmented reality display system according to claim 1, wherein the body further comprises a coupling end communicating with the optical waveguide device; the output ends are inserted into the coupling end so as to couple with the optical waveguide device.

10. An augmented reality display device, comprising an augmented reality display system, the augmented reality display system comprising:

a body;

an image source device arranged in the body, the image source device being configured to output image information;

an optical waveguide device arranged in the body, the optical waveguide device being configured to receive the image information; and an optical fiber array image transmission bundle arranged in the body, the optical fiber array image transmission bundle being arranged between the image source device and the optical waveguide device, the optical fiber array image transmission bundle comprising a plurality of optical fibers, each of the plurality of optical fibers comprising an input end and an output end opposite to the input end, arrangement positions of end faces of the plurality of optical fibers at the input ends and at the output ends being the same, each input end being coupled with a first microlens which protrudes outward beyond the input end, each output end being coupled with a second microlens which protrudes outward beyond the output end, the image information output by the image source device being coupled into the optical fiber array image transmission bundle through the first microlenses for total reflection, and then collimated by the second microlenses and emitted directly to the optical waveguide device;

wherein the first microlens is physically connected to the input end, and the first microlens is physically connected to the output end.

11. The augmented reality display device according to claim 10, wherein the first microlenses are coupled to the image source device; the image information of the image source device is coupled into the optical fibers along a first angle; the image information is totally reflected along a second angle in the optical fibers through the first microlenses, and then collimated by the second microlenses and emitted directly to the optical waveguide device.

12. The augmented reality display device according to claim 11, wherein the second angle is larger than a critical angle of the optical fiber.

13. The augmented reality display device according to claim 11, wherein each optical fiber comprises a fiber core and a cladding layer surrounding the core; the first microlens and the second microlens are arranged at two ends of the fiber core along an axis direction of the fiber core, respectively; the image source device is coupled into the fiber core at the first angle through the first microlenses, totally reflected between a junction of the fiber core and the cladding layer at the second angle, and then collimated by the second microlenses and emitted directly to the optical waveguide device.

14. The augmented reality display device according to claim 10, wherein the end faces of the plurality of optical fibers are hexagonal.

15. The augmented reality display device according to claim 14, wherein centers of two adjacent optical fibers are located on a same straight line.

16. The augmented reality display device according to claim 10, wherein the optical fibers at the input ends and the optical fibers at the output ends are glued and fixed; the optical fiber array image transmission bundle further comprises a middle section which is located between the input end and the output end.

17. The augmented reality display device according to claim 10, wherein an end face area of the input end is consistent with an area of the image source device.

18. The augmented reality display device according to claim 10, wherein the body further comprises a coupling end communicating with the optical waveguide device; the output ends are inserted into the coupling end so as to couple with the optical waveguide device.

19. An augmented reality display device, comprising an augmented reality display system, the augmented reality display system comprising:
   a body;
   an image source device arranged in the body, the image source device being configured to output image information;
   an optical waveguide device arranged in the body, the optical waveguide device being configured to receive the image information; and
   an optical fiber array image transmission bundle arranged in the body, the optical fiber array image transmission bundle being arranged between the image source device and the optical waveguide device, the optical fiber array image transmission bundle comprising a plurality of optical fibers, each of the plurality of optical fibers comprising an input end, an output end disposed opposite to the input end, a first microlens connected to the input end and protruding beyond the input end along a first direction away from the output end, and a second microlens connected to the output end and protruding beyond the output end along a second direction away from the input end; the image information output by the image source device being coupled into the optical fiber array image transmission bundle through the first microlenses for total reflection, and then collimated by the second microlenses and emitted directly to the optical waveguide device.

20. The augmented reality display device according to claim 19, wherein each optical fiber comprises a fiber core; the first microlens and the second microlens of each optical fiber are physically connected with two ends of the fiber core along an axis direction of the fiber core, respectively; the image source device is coupled into the fiber core at a first angle through the first microlens, and collimated by the second microlens and emitted directly to the optical waveguide device.

* * * * *